(12) United States Patent
Morris

(10) Patent No.: US 7,028,075 B2
(45) Date of Patent: Apr. 11, 2006

(54) METHOD AND SYSTEM FOR SHARING DIGITAL IMAGES OVER A NETWORK

(75) Inventor: Robert P. Morris, Raleigh, NC (US)

(73) Assignee: FlashPoint Technology, Inc., Raleigh, NC (US)

( * ) Notice: Subject to any disclaimer, the term of this patent is extended or adjusted under 35 U.S.C. 154(b) by 0 days.

(21) Appl. No.: 10/131,728

(22) Filed: Apr. 23, 2002

(65) Prior Publication Data

US 2003/0200268 A1 Oct. 23, 2003

(51) Int. Cl.
G06F 15/16 (2006.01)
G06F 17/60 (2006.01)
G03B 17/24 (2006.01)

(52) U.S. Cl. .................. 709/206; 709/203; 709/207; 709/219; 705/27; 396/311

(58) Field of Classification Search ............. 709/206, 709/207, 219, 203–205, 229; 705/26, 27; 396/311
See application file for complete search history.

(56) References Cited

U.S. PATENT DOCUMENTS

| | | | | | |
|---|---|---|---|---|---|
| 5,517,605 | A | * | 5/1996 | Wolf | 707/104.1 |
| 5,758,194 | A | * | 5/1998 | Kuzma | 710/66 |
| 5,781,901 | A | * | 7/1998 | Kuzma | 707/10 |
| 5,848,413 | A | * | 12/1998 | Wolff | 707/10 |
| 5,903,723 | A | * | 5/1999 | Beck et al. | 709/200 |
| 5,945,989 | A | * | 8/1999 | Freishtat et al. | 345/760 |
| 5,987,504 | A | * | 11/1999 | Toga | 709/206 |
| 5,991,798 | A | * | 11/1999 | Ozaki et al. | 709/217 |
| 6,017,157 | A | * | 1/2000 | Garfinkle et al. | 396/639 |
| 6,028,603 | A | * | 2/2000 | Wang et al. | 345/776 |
| 6,035,323 | A | * | 3/2000 | Narayen et al. | 709/201 |

(Continued)

FOREIGN PATENT DOCUMENTS

| | | | |
|---|---|---|---|
| EP | 1197843 A2 | * | 4/2002 |
| KR | 2002027252 A | * | 4/2002 |

OTHER PUBLICATIONS

Gottesman et al. "Digital Photography for Everyone: Manage, Share, Print," PC Magazine Reviews. Mar. 16, 2004.*
Metz, Cade. "Send Photos Without Limits (Photoleap Review)" PC Magazine, www.pcmag.com, Feb. 16, 2005.*
Dake, Michael. "PhotoChannel Networks Inc. Launches My PhotoSite and My Albums," Corporate News, Jan. 31, 2000.*
Solis, Brian. "Club Photo Simplifies Internet Photo Sharing with New Living Album 99 Software," Club Photo Release on site, Feb. 9, 1999.*
Landon, Bill. "Smugmug Announces Online Photo Sharing for Booming Camera Phone Market," PDA Today (www.pdatoday.com). Mar. 21, 2004.*

(Continued)

*Primary Examiner*—Patrice Winder
*Assistant Examiner*—Melvin H. Pollack
(74) *Attorney, Agent, or Firm*—Sawyer Law Group LLP

(57) ABSTRACT

A system and method for sharing digital images over a network, such as the Internet, wherein the first person desires to send images from a first computer to a second person having a second computer that includes a standard email program. The system and method include sending an email request with the images and an address of the second user from the first computer to a server. In response to receiving the email request, the images are stored on the server, and the server creates a standard email message from the email request. The method and system further include inserting at least one link to the stored images into the email message, and transmitting the email message over the network for delivery to the second user. The second user may then receive and open the email message on the second computer using the standard email program and click on the at least one link to display the images.

29 Claims, 7 Drawing Sheets

U.S. PATENT DOCUMENTS

| | | | | |
|---|---|---|---|---|
| 6,058,428 | A | * | 5/2000 | Wang et al. ................. 709/232 |
| 6,141,695 | A | * | 10/2000 | Sekiguchi et al. ........... 709/246 |
| 6,202,061 | B1 | * | 3/2001 | Khosla et al. .................. 707/3 |
| 6,223,190 | B1 | * | 4/2001 | Aihara et al. ................ 715/513 |
| 6,223,213 | B1 | * | 4/2001 | Cleron et al. ................ 709/206 |
| 6,232,973 | B1 | * | 5/2001 | Dow et al. ................... 345/810 |
| 6,275,850 | B1 | * | 8/2001 | Beyda et al. ................ 709/206 |
| 6,295,058 | B1 | * | 9/2001 | Hsu et al. .................... 345/769 |
| 6,298,446 | B1 | * | 10/2001 | Schreiber et al. ............ 713/201 |
| 6,301,586 | B1 | * | 10/2001 | Yang et al. ............... 707/104.1 |
| 6,301,607 | B1 | * | 10/2001 | Barraclough et al. ........ 709/204 |
| 6,304,898 | B1 | * | 10/2001 | Shiigi .......................... 709/206 |
| 6,314,454 | B1 | * | 11/2001 | Wang et al. ................. 709/206 |
| 6,327,610 | B1 | * | 12/2001 | Uchida et al. ............... 709/206 |
| 6,334,142 | B1 | * | 12/2001 | Newton et al. .............. 709/206 |
| 6,360,252 | B1 | * | 3/2002 | Rudy et al. .................. 709/206 |
| 6,366,698 | B1 | * | 4/2002 | Yamakita ..................... 382/187 |
| 6,373,507 | B1 | * | 4/2002 | Camara et al. .............. 345/825 |
| 6,377,978 | B1 | * | 4/2002 | Nguyen ....................... 709/206 |
| 6,389,456 | B1 | * | 5/2002 | Okimoto ...................... 709/206 |
| 6,396,592 | B1 | * | 5/2002 | Okada et al. .............. 358/1.15 |
| 6,405,224 | B1 | * | 6/2002 | Van Der Meer ............ 715/513 |
| 6,446,115 | B1 | * | 9/2002 | Powers ........................ 709/206 |
| 6,453,340 | B1 | * | 9/2002 | Emura ......................... 709/206 |
| 6,453,361 | B1 | * | 9/2002 | Morris ......................... 709/250 |
| 6,460,075 | B1 | * | 10/2002 | Krueger et al. ............. 709/206 |
| 6,489,980 | B1 | * | 12/2002 | Scott et al. .................. 345/854 |
| 6,510,438 | B1 | * | 1/2003 | Hasegawa ................. 707/104.1 |
| 6,542,936 | B1 | * | 4/2003 | Mayle et al. ................ 709/250 |
| 6,567,983 | B1 | * | 5/2003 | Shiimori ...................... 725/105 |
| 6,578,078 | B1 | * | 6/2003 | Smith et al. ................. 709/224 |
| 6,613,100 | B1 | * | 9/2003 | Miller ......................... 715/526 |
| 6,631,369 | B1 | * | 10/2003 | Meyerzon et al. ............. 707/4 |
| 6,650,831 | B1 | * | 11/2003 | Thompson ..................... 396/6 |
| 6,707,999 | B1 | * | 3/2004 | Iwagaki et al. ............. 396/429 |
| 6,715,003 | B1 | * | 3/2004 | Safai ............................ 710/33 |
| 6,718,321 | B1 | * | 4/2004 | Birrell et al. ................... 707/2 |
| 6,738,155 | B1 | * | 5/2004 | Rosenlund et al. ........ 358/1.15 |
| 2002/0120757 | A1 | * | 8/2002 | Sutherland et al. ......... 709/229 |

OTHER PUBLICATIONS

Landon, Bill. "Snapfish Breaks the Upload Barrier in Online Photo Processing—Now Email in Pictures Directly From Camera Phone or Computer," PDA Today. May 19, 2004.*

CNet Staff. "Snapfish Develops E–mall Uploads," ZDNet.com. May 19, 2004.*

Coursey, David. "My Favorite Ways to Share Digital Photos," ZDNet.com. Nov. 6, 2003.*

Select Pages from www.bluemountain.com, as shown through web.archive.org, Apr. 22, 1998.*

* cited by examiner

Install Client

Main Window

Send an Email

Create Email Window

Handle Send Request

Handle Send Request

METHOD AND SYSTEM FOR SHARING DIGITAL IMAGES OVER A NETWORK

FIELD OF THE INVENTION

The present invention relates to the manipulation and transmission of digital images, and more particularly to a method and system for sharing digital images over a network, such as the Internet.

BACKGROUND OF THE INVENTION

The use of the Internet as a means to share photographs as digital images has been growing rapidly. This activity will continue to grow as more consumers (and businesses) use digital cameras and scanners. There are projected to be about 82 million households in the United States with Internet access. Approximately, 42 million of these households will have either a digital camera and/or a scanner. Of those 42 million households it is estimated that 28 million will use the Internet to share images. These estimated number of households sharing images over the Internet grows to an estimated 69 million by 2007.

Currently, there are two predominant means by which digital images are shared over the Internet, email and web photo-hosting sites. Approximately 30% of households sharing images over the Internet make use of online photo-hosting sites such as Ophoto™ and Photopoint™. Approximately 60% use email to send digital images to others.

Online photo-hosting sites provide a number of benefits to their users. Online photo-hosting sites typically do a good job in presenting images to users. The performance of the presentation is usually good for both dialup access and broadband users, since the images used in the presentation can be scaled to fit the space and bandwidth available. In addition, these services are able to integrate into the image presentation access to additional services such as ordering prints, calendars, etc. These services offer some measure of privacy by allowing image owners some control over who may see their photographs.

Current photo-hosting sites have a number of problems that they have yet to overcome that prevents wider use of their services and has made profitability difficult. The process of uploading pictures from a home PC to a website is time consuming due to current bandwidth limitations. The user interface for this upload process typically forces users to browse through directories on the home PC and identify pictures by filename. This is a task many users choose to avoid. The perceived loss of privacy is another issue that keeps many users from using the services of photo-hosting sites. User's who store photos on these sites must "handover" their images to the site. The bankruptcies of a number of these sites have raised the issue of who owns the images once they have been uploaded with the answer to the consumer being that the site owns the images. Use of these sites requires registration by those storing images on the site as well as by those who just wish to view images they have been invited to see. Registration typically requires disclosure of information that many consumers are hesitant to provide for fear of it being sold to third parties. Whether this concern for privacy is based in fact is irrelevant since the perception is real and appears to be deeply ingrained. Due to competition and infrastructure costs, photo-hosting sites are moving towards a subscription-based model with fees for storage and other previously free services. These "subscription" fees have undoubtedly kept many user's away. Further, Napster has raised the issue of whether site providers are responsible for enforcing copyrights, particularly for those sites that support public photo albums with searching capabilities.

Email is clearly the most used application on the Internet today. Its no surprise, given the perceived and real disadvantages of photo-hosting services, that email is also the dominant means for sharing digital photographs. Email has many advantages, the primary one being that users are very familiar with it and comfortable with it. Email allows users to share images and at the same time provide context for the image(s) in the text in the body of the email. Its person-to-person, making it personal with no perceived third-party intervening. This personal nature of email has fostered the perception of privacy that persists among users despite the many privacy warnings appearing in the media. There is no perceived third-party who "owns" the images despite the fact that emails and attachments may be stored for indefinite periods of time on the user's mail host and the various mail relays used to deliver them. This person-to-person aspect of email has further freed the infrastructure providers from responsibility for copyright enforcement.

Just as with most everything in life, email has its downside. The process of "attaching" images to an email involves the same requirement to find images by navigating through file system directories and identifying images by filename that the image upload process has for photo-hosting services. Many users who have sent an email with an image attached have experienced the pain of discovering how long it takes to send a full-resolution image over a dial-up connection. To resize, crop, or lower the resolution of an image before emailing it requires the acquisition and use of another software program to perform the editing on the image. This lo: process usually results in two image files for the user: the original image plus the email version. Further, ephotomail clients keep a copy of all attachments until the sent emails are deleted by the user (typically this requires two deletes, one from the sent folder and one from the trash folder).

The receiver of an image goes through perhaps more pain than the sender during the download. Typically, the user doesn't know what is clogging up his email until its fully downloaded to the ephotomail client. Many users are afraid to open unrecognized attachments for fear of viruses. Those brave enough to open the attachments often find that there is no viewer available or configured to handle the file type. Those fortunate enough to see the images must view them one-at-a-time. Those wanting a print of an image either have to save the attachment, find it in the file system, copy it to a CD, and take it to a photo shop; or must upload the image to a web-based print provider. To manage received photos users must save the attached images and manage them as raw files, use a separate software program to manage them locally, or upload them to a photo-hosting service. The attached images use up local storage until the receiver deletes the associated emails from the photomail client (again a two delete process).

Despite the disadvantages of sharing images by email, users have adopted this method in large numbers. Accordingly, what is needed is a method and system for sharing images over the Internet that preserves the advantages of using email, while at the same time addressing email's most bothersome disadvantages. The system should be both easy to use for the user, and also easy to understand. The present invention addresses such a need.

SUMMARY OF THE INVENTION

The present invention provides a system and method for sharing digital images over a network, such as the Internet, wherein one person desires to send images from a first computer to a second person on a second computer. The system and method include sending an email request with the images and an address of the second user from the first computer to a server. In response to receiving the email request, the images are stored on the server, and the server creates a standard email message from the email request. The method and system further include inserting at least one link to the stored images into the email message, and transmitting the email message over the network for delivery to the second user. The second user may then receive and open the email message on the second computer using the standard email program and click on the at least one link to display the images.

According to the system and method disclosed herein, the present invention allows users to send what appear to be regular emails with images and allows recipients to receive the emails using a standard email program just like any other email. But because the emails are sent first to a server for processing where the images are stripped, stored on the server, and replaced with links in the emails, the images are not sent with email message to the recipient. In addition, the recipient is not required to be registered with the server just to view images, further simplifying the process.

DETAILED DESCRIPTION

The present invention relates to a system for sharing digital images over a network via email. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

The present invention is a system for sharing digital images over the Internet that operates similarly to standard email applications, but is easier to use. The image sharing system is used by two sets of "users", users who have pictures to share, and users who desire to view the pictures.

Figure 1:
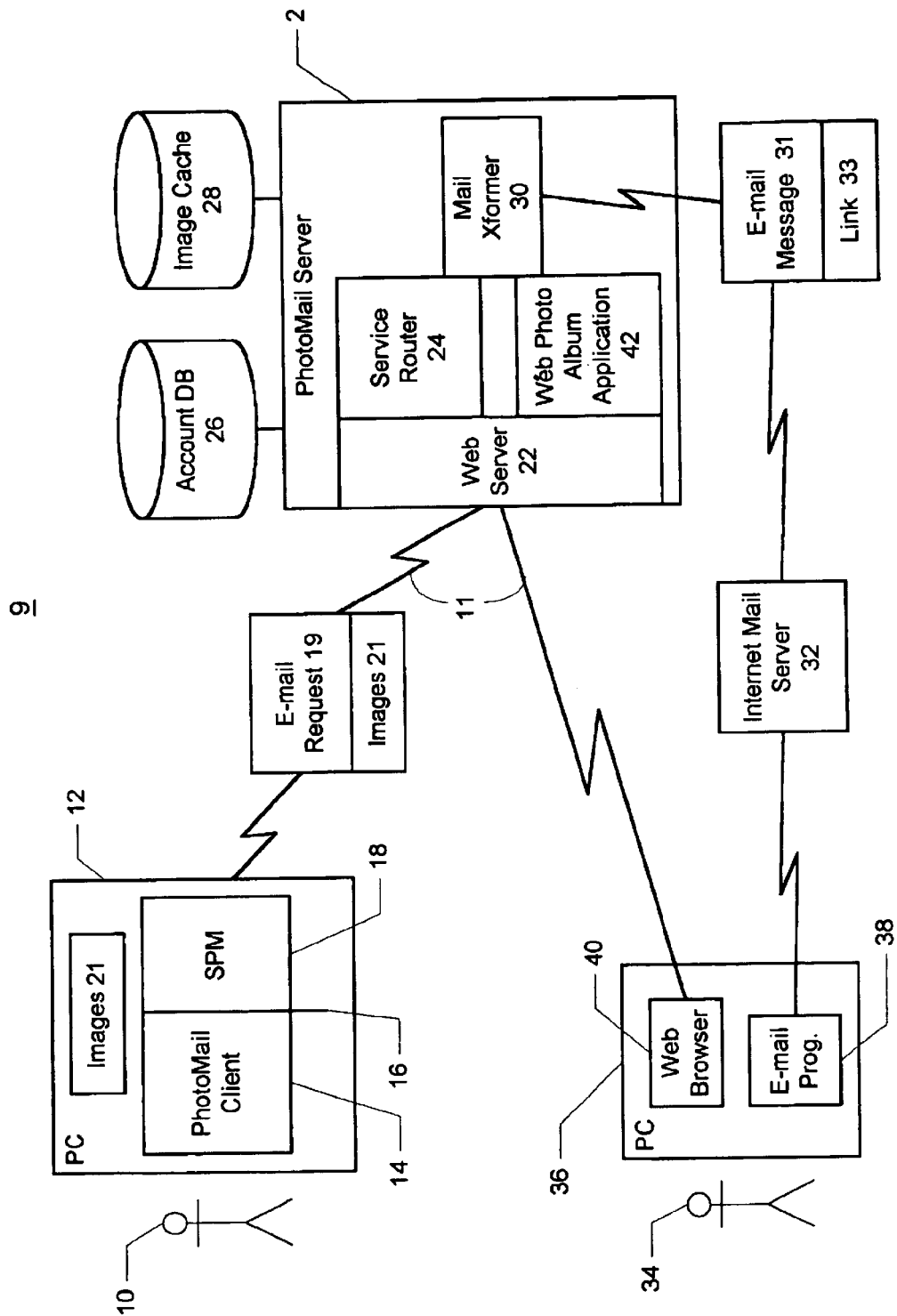
FIG. 1 is a block diagram illustrating the image sharing system in accordance with the preferred embodiment of the present invention.

FIG. 1 is a block diagram illustrating the image sharing system 9 in accordance with the preferred embodiment of the present invention. The image sharing system 9 includes a photomail client application 14 that runs on a user's computer 12, and a photomail server 20, which communicate over a network 11, such as the Internet. The photomail client application 14 includes a graphical user interface (GUI) that provides local functions for locating images, editing images, and managing images in general. The photomail client application 14 includes some functions of standard email programs, but is not intended to replace standard email applications.

According to the present invention, a user 10 uses the photomail client application 14 to share images stored on, or accessible by, the computer 12 with another user 34 (recipient) at a second computer 26 that includes a standard web browser 40 and email application 38. Rather than sending a standard email message 19 with the images 21 directly to the user 34 through a conventional Internet mail server 32, the photomail client application 14 first sends an email request 19 with the images 21 to the photomail server 20. Once the email request 19 is received, the photomail server 20 strips and stores the images 21, and then sends a standard email message 31 to the recipient with a link 33 to the images 21, rather than the images 21 themselves. The email message 31 is then received on the recipient's computer 36 by the standard email application 38. Once the email message 31 is opened, the user clicks on the link 33 and the images 21 are displayed from the photomail server 20 in the recipient's web browser 40.

Connectivity between the photomail client 14 and the photomail server 20 is provided by a service provider module (SPM) 18, which hides the protocol used from the photomail client 14. The photomail client 14 uses the SPM 18 to authenticate the user and to send email requests 19. In a preferred embodiment, two SPMs 18 are provided with the photomail client 14. One uses an RPC (Remote Procedure Call) protocol such as RMI to communicate with the photomail server 20, and one uses a HTTP-based protocol that uses multipart mime messages for a HTTP payload. The interface between the photomail client 14 and the SPM 18 is known as the SPM API 16. The photomail client 14 reads a configuration file that identifies an object factory class, which it calls to create an instance of an SPM 18.

The photomail server 20 includes a web server 22, a service router 24, an account database 26, an image cache 28, a mail transformer application 30, and a web photo album application 42. The web server 22 uses a servlet to parse and route requests received over the Internet. The photomail server 20 maintains the id account database 26 and uses it to authenticate users 10, authorize the requests 19, and maintain account statistics. Once authorized, requests 19 are sent to the service router 24, which routs the requests 19 to specific command handlers, such as the mail transformer 30 and a web photo album application 42.

In operation, the user 10 opens the photomail client 14 when the user 10 wishes to share images 21 with another user 34. Using the GUI of the photomail client 14, the user 10 locates and selects desired images 21. Through the user interface, the user 10 may also perform image editing operations on the images 21, such as resizing and cropping and so on. When the user 10 wishes send the selected images 21 to the other user 34, the user 10 chooses an option to create an email request 19. The email request 19 appears to the user 10 as a standard email message 31 because it includes a To field, a CC field, a subject line, a body and a place to attach the selected images 21. In a preferred embodiment, the photomail client 14 is integrated with the user's standard email program by sharing the same address book, allowing the user to enter one more recipient addresses from address book into the To and CC fields.

After the user 10 has composed the email request 19, and clicks a button to send the request 19, the photomail client 14 transmits the email request 19 directly to the photomail server 20. This is in contrast to standard email programs, which sends email messages 31 to the Internet mail server 32 for delivery to recipients.

When the photomail server 20 receives the email request 19 from the photomail client 14, the web server 22 sends the request to the service router 24 which routes the email requests 19 to the mail transformer 30. According to one aspect of the present invention, the mail transformer 30 takes the email request 19 and automatically creates a standard Internet email message 31 using the To, CC, subject, and body portions of the request 19. However, the photomail server 20 is stores the images 21 associated with the email request 19 in the image cache 28. The web photoalbum application 42 is then used to create an "album" for the images 21 comprising one or more web pages that are formatted for viewing and navigating among the images 21 using a web browser. The server inserts a link 33 or URL to the "album" in the email message 31 with instructions describing what the link 33 is for. The server 20 then sends the email message 31 to the Internet email server 32 for delivery to the designated recipient(s) 34.

The recipient user 34 receives the email message 31 using the standard email program 38, which may be PC-based or browser based. According to the present invention, recipients of the email message 31 are no longer forced to download the sent images 21 as attachments. Rather, by activating the link 33 embedded in the email, the user 34 can view the images 21 as an online photo album using their web browser. While viewing the online photo album, the user 34 may choose to download the full-size image if desired or can take advantage of any other services offered by the web album application 42.

In an alternate embodiment, the photomail server 20 creates an HTML email message 31 to send and imbeds links 33 to scaled-down versions of the sent images 21. The recipient may thus view the resulting photo album in his/her normal email program 38. A web based photo album application 42 is not necessary in this embodiment, but can be provided to make additional features available to both the sender and recipients.

As stated above, prior to using the image sharing system 9, the user must obtain and install the photomail client 14. In a preferred embodiment, the user 10 will be able to obtain the photomail client 14 from a number of different sources including a web site for the image sharing service, shareware websites, and on CD's packaged with digital cameras, for instance. The user 10 will be able to install the software using standard install software for the user's operating system, such as InstallShield for Windows platforms, for example.

Figure 2:
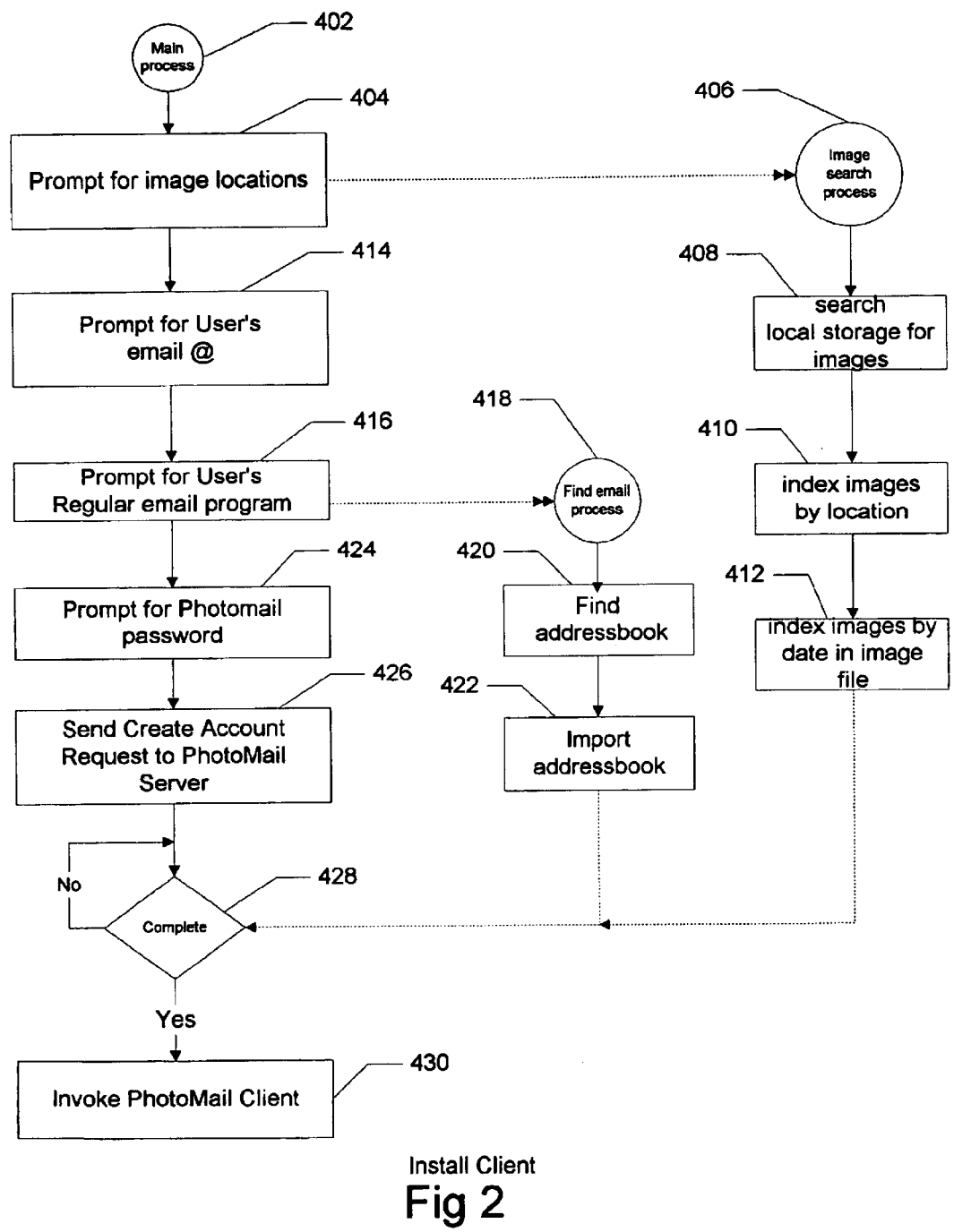
FIG. 2 is a flow chart illustrating an installation and configuration process for the photomail client in accordance with one preferred embodiment of the present application.

FIG. 2 is a flow chart illustrating an installation and configuration process for the photomail client 14 in accordance with one preferred embodiment of the present application. During the installation, the user 10 will be required to enter the following information (not necessarily in order). In step 404, the user is prompted to optionally specify a directory or directories where the photomail client 14 will first look for images 21 to attach in the email request 19. Alternatively, in step 406, the user may indicate that the photomail client 14 is to search local storage and create a catalog of images 21. In response, the photomail client 14 will catalog images 21 automatically by location in the file system in step 410 or by date (found in the image metadata) in step 412.

In step 414, the photomail client 14 prompts the user 10 for the user's current email address. In step 416, the photomail client 14 prompts the user to specify the user's regular email program, preferably from a list of choices. The photomail client 14 will locate the user's regular email program and will located the email program's addressbook in step addressbook in step 420 and import it in step 422.

In step 424, the photomail client 14 will prompt the user 10 for photomail password, which the user will use to access his or her account on the photomail server 20. After all the information is collected, in step 426, the photomail client 14 sends a request to the photomail server 20 to create an account for the user 10. Once all the foregoing tasks are complete in step 428, the photomail client 14 is invoked in step 430.

Figure 3:
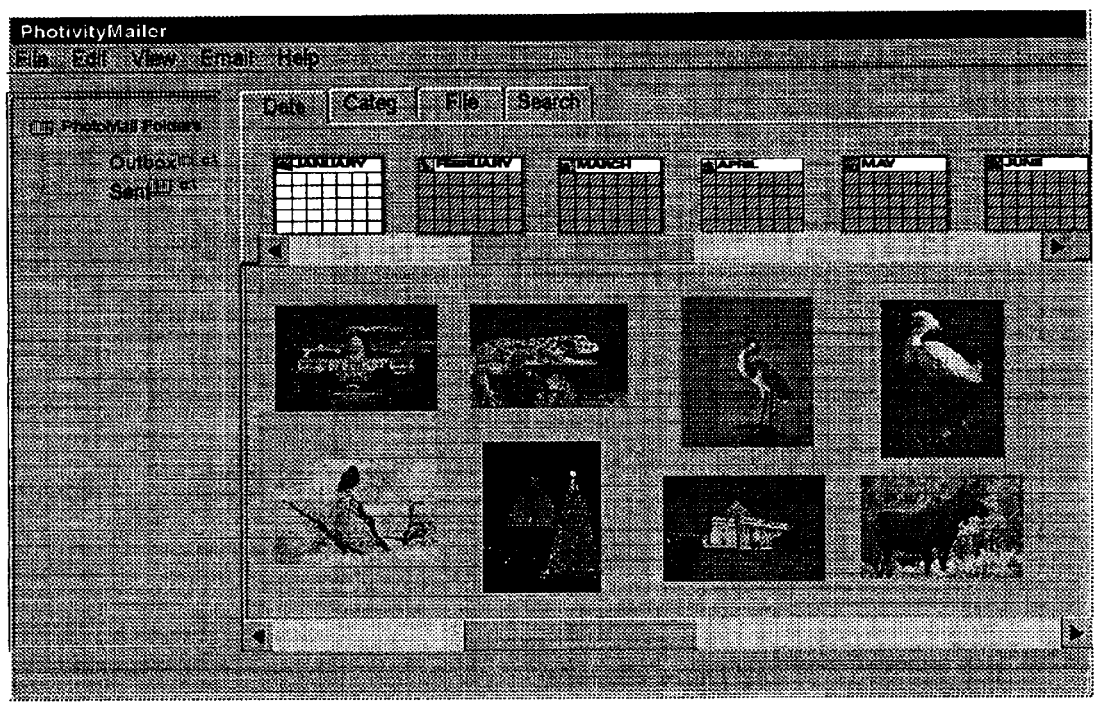
FIG. 3 depicts an example of the main application window of the photomail client graphical user interface.

Once the photomail client 14 has been started, either automatically during installation or manually by the user 10, a main GUI window is displayed to the user. FIG. 3 depicts an example of the main application window of the photomail client 14 GUI, which gives the user 10 the ability to perform the following functions:

Create email message 31 requests

Browse the images 21 stored locally by selecting from a display of thumbnails and move them from one folder to another by drag and drop Edit images 21, e.g., resize, change resolution, crop, and rotate Find, edit, and forward previously sent messages, and to create new folders and subfolders for sent emails. There is also a folder for drafts of incomplete emails.

As shown in FIG. 3, images 21 may be displayed by date, where the user 10 can click on a graphical month to see all the images 21 taken during that time period. Images 21 may also be displayed by subject matter category by clicking the appropriate tab.

Figure 4:
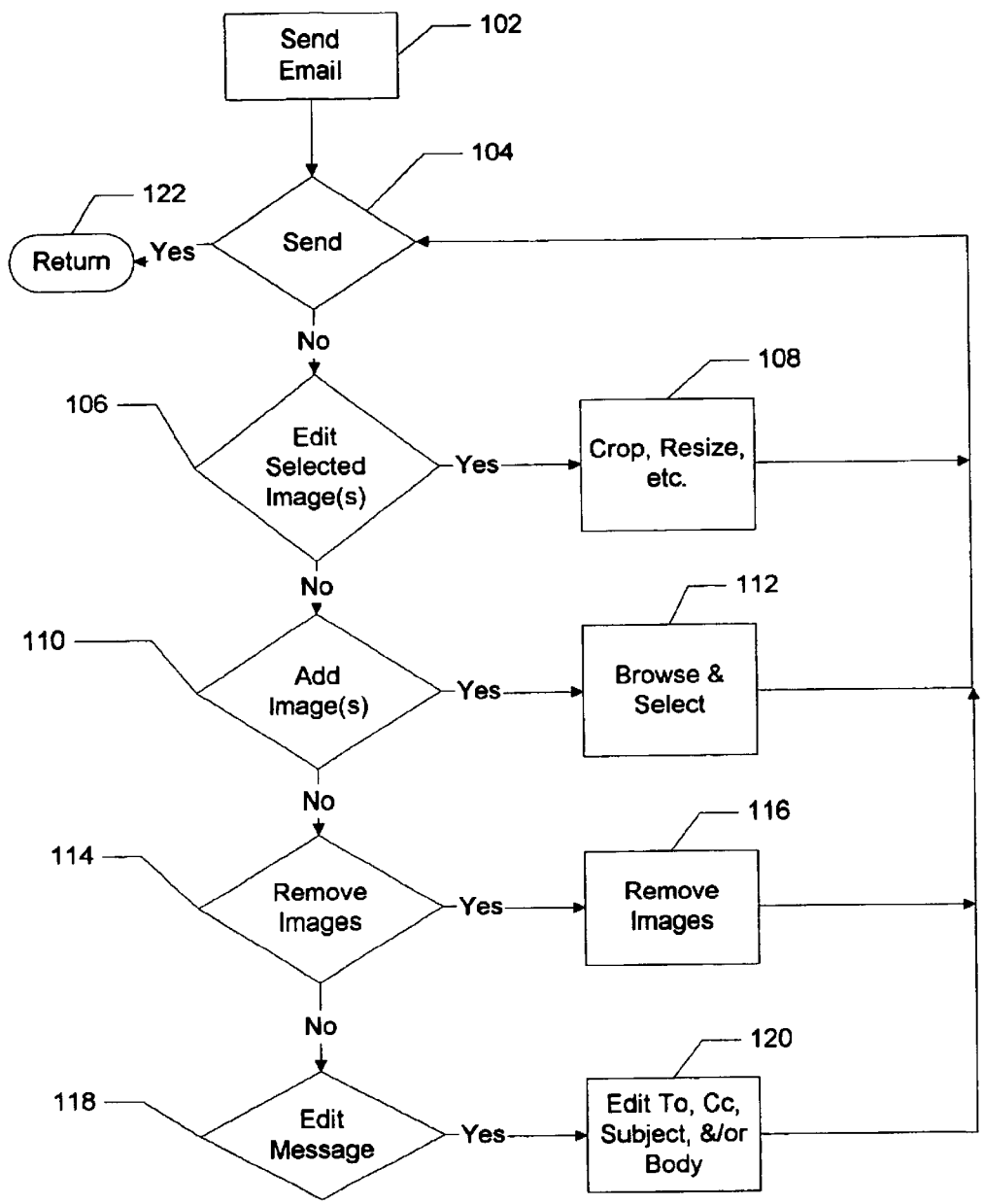
FIG. 4 is a flow chart illustrating the process enabled by the photomail client to allow a user to send images via email.

FIG. 4 is a flow chart illustrating the process enabled by the photomail client 14 to allow a user 10 to send images 21 via email. The user 10 creates an email in step 102 by clicking an email button from the main application window, which causes a create email window to be displayed.

Figure 5:
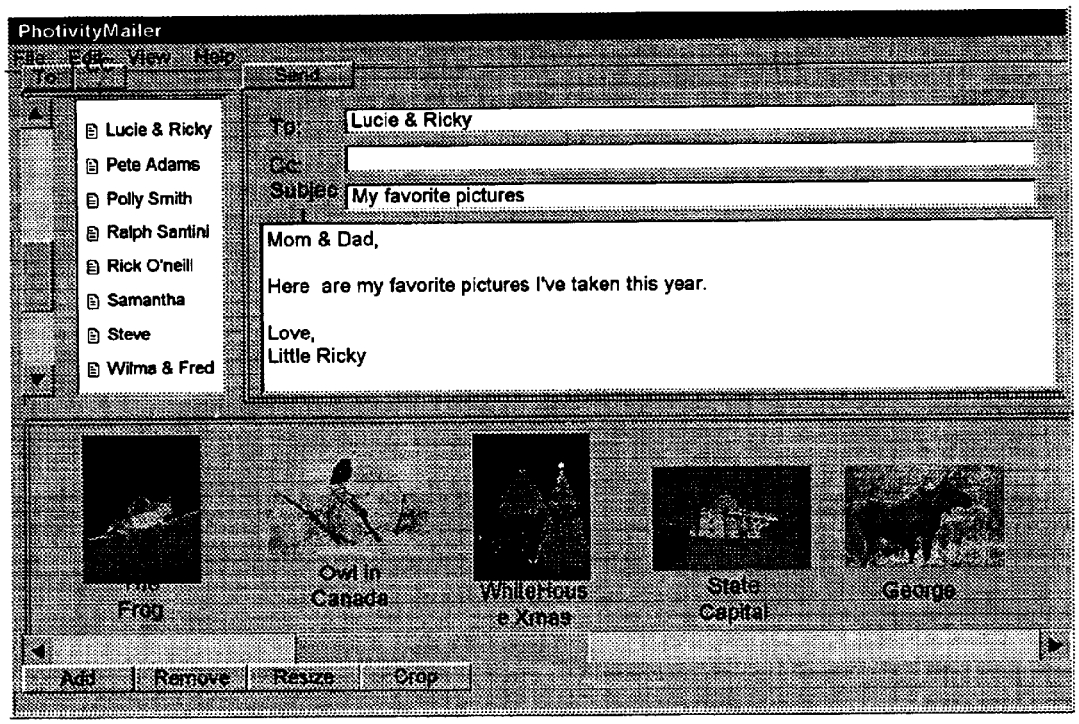
FIG. 5 is a diagram illustrating an example create email window.

FIG. 5 is a diagram illustrating an example create email window. Once the window opens, the user 10 will see a standard email template with fields for To, CC, and BCC as well as a subject line, and input area for the body of the email, as described above. The email addresses may be imported from the user's regular email program, as described in FIG. 2.

Referring again to FIG. 4, once the create mail window is opened and an image or group of images 21 has been selected, in step 106 the user 10 may choose to edit selected images 21. In step 108, the editing functions that may be chosen include resizing, cropping, rotating, and changing image resolution, for instance. The user 10 may preferably configure defaults that can be applied automatically for resizing and resolution. As shown in FIG. 4, the bottom of the create email request 19 includes buttons for adding and removing images 21. By clicking the add button, the user 10 may add images 21 to the email request 19 by browsing and selecting images 21 in step 112. In one embodiment, the user 10 may select the images 21 from the main application window, and can move images into the email request 19 by dragging and dropping or by double clicking on an image in the main application window while the create email window is open. The user 10 may remove images 21 already included in the email request 19 by choosing which images 21 to remove and by clicking the remove button in step 114, causing the selected images 21 to be removed in step 116. In step 118, the user 10 may also choose to simply edit the email message 31, by editing the text of the To, CC, subject and/or body of the message in step 120.

In step 104, once the user 10 is ready to send the email request 19, the user 10 clicks the send button. Although not shown, the photomail client 14 may include an outbox where mail to be sent is collected while it is being sent or while the user 10 is offline.

In a preferred embodiment, email requests 19 are not sent serially as is the case with standard mail program. Rather, the photomail server 20 supports multiple concurrent sends from the photomail clients 14. All sends will occur on a separate thread so as not to block interaction between the user 10 and the photomail client 14. The user 10 can schedule sends so they occur at a particular time, such as at night. All sends will be restartable, which means that if a connection is lost, the send will resume at the point where the send was broken.

Figure 6A:
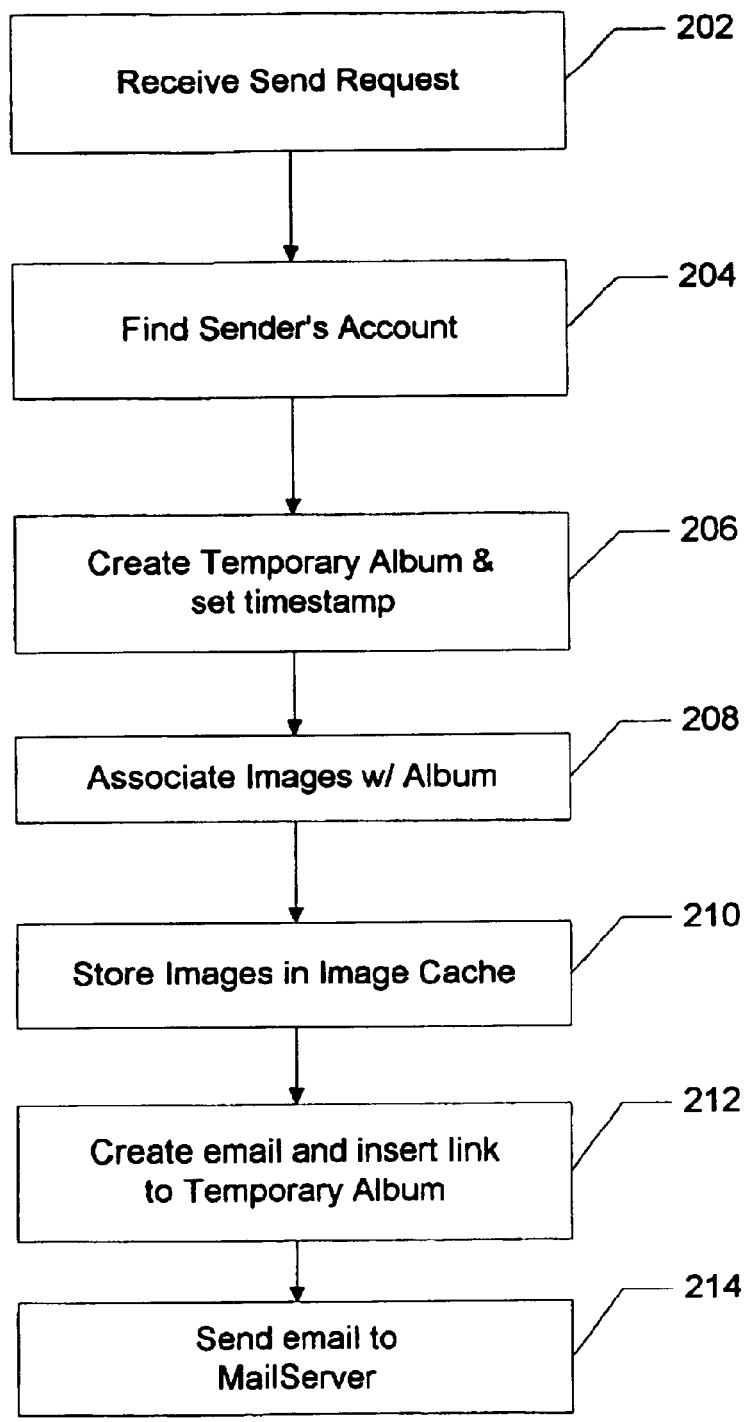
FIGS. 6A and 6B are flow charts illustrating processes implemented by the photomail server to handle email requests received by the photomail client.
Figure 6B:
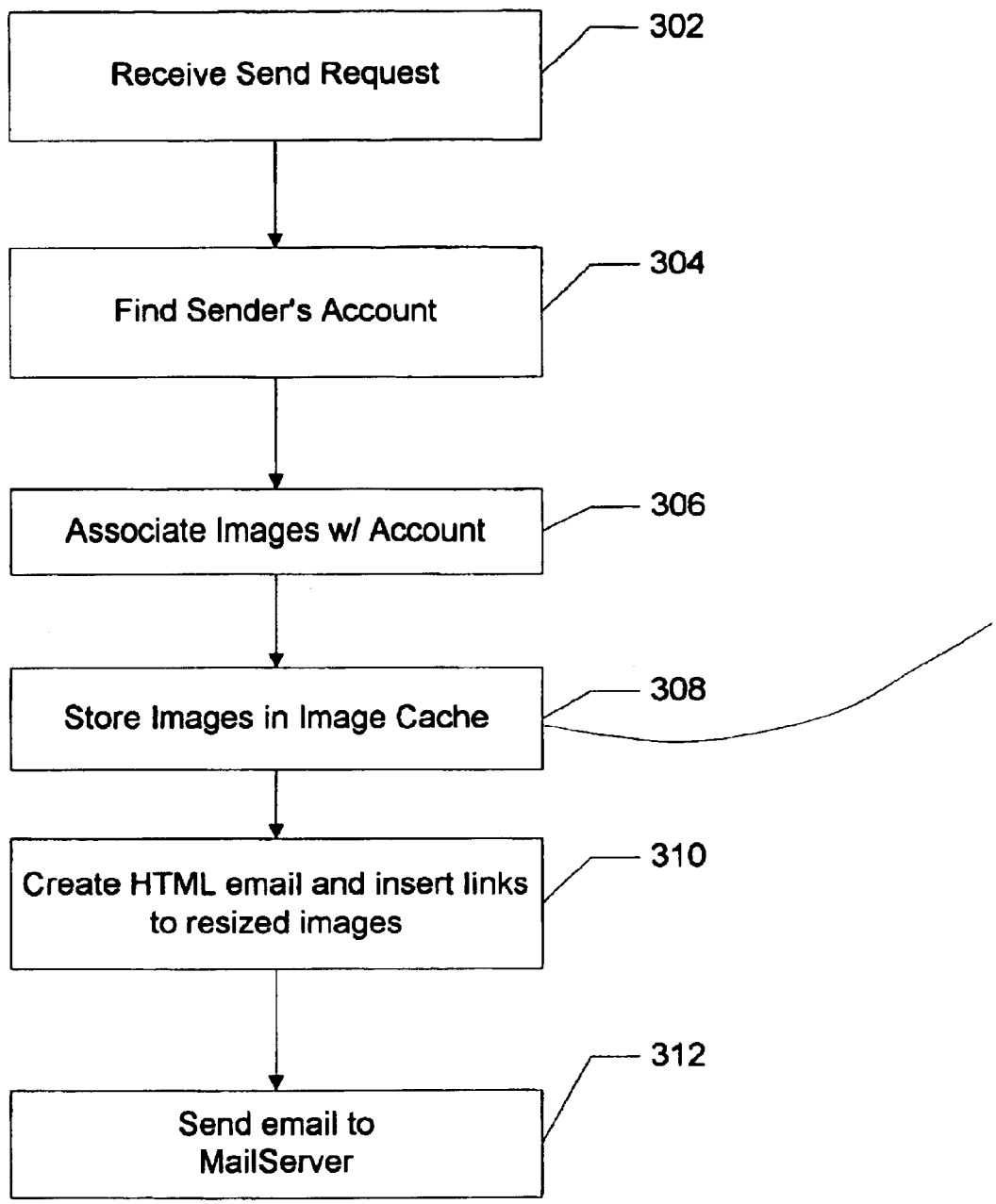

FIGS. 6A and 6B are flow charts illustrating processes implemented by the photomail server 20 to handle email request 19 received by the photomail client 14. FIG. 6A describes the process the photomail server 20 takes to support handling of email requests 19 where the images 21 in the email message 31 are to be presented as an online photo album. The process begins in step 202 when the photomail server 20 receives the email request 19 from the photomail client 14. In step 204 the photomail server 20 locates the sender's account information and authenticates the user 10. Once the user 10 is authenticated and the message is completely received, in step 206 the web album photo application creates a temporary "album" and a set of timestamps for purposes of locating the images 21 and for providing a context for viewing and navigating the images 21. In a preferred embodiment, images 21 sent using the photomail server 20 are only temporarily stored on the server for some set period of time, such as 30 days. At that point, they are deleted from the image cache 28. The timestamps associated with the images and albums are used to determine if the set time period has expired for each. The photomail server 20 is not intended to be a permanent repository, although permanent storage and online photo albums may be provided.

In step 208, the images 21 are associated with the temporary album, and stored in the image cache 28 in step 210. In step 212, the photomail server 20 creates a standards compliant email message 31 from the email request 19 and inserts a link 33 to the album in the email message 31 with some minimal information describing to the recipient what will be displayed when they click the link. In step to 214, the message is sent through a conventional Internet mail server to the recipients defined in the To, CC, and BCC address lists.

FIG. 6B describes the process the photomail server 20 takes to support handling of email requests 19 where the images 21 are not presented as a web album using the web photo album application 42. The photomail server 20 in this case creates an HTML based email with links 33 to resized images 21 embedded in the HTML email message 31. The photomail server 20 may support both the processes shown in FIGS. 6A and 6B for sharing images 21.

The process begins in step 302 as in FIG. 6A when the photomail server 20 receives the email request 19 from the photomail client 14. In step 304 the photomail server 20 locates the sender's account information and authenticates the user 10. In step 306, the images 21 are associated with the user's account, the images 21 are stored in the image cache 28 along with resized versions of the images (made smaller in size) in step 308. In step 310, the photomail server 20 creates an HTML based email message 31 and embeds links 33 to the resized images 21 in the HTML email message 31. In step 312, the email message 31 is sent to the conventional mail server to the recipients defined in the To, CC, and BCC address lists.

In both the embodiment of FIGS. 6A and 6B, the recipient(s) receives the email message 31 from the photomail server 20 using a standard email program just like any other email. The recipient, however, is not forced to download all the images 21 since the images 21 are stored on the Photomail server 20. The recipient reads the message from the sender along with the information regarding the link 33 to the images 21. If the recipient chooses to see the images 21 by selecting the link, then for the embodiment of FIG. 6A, a web page displaying the images 21 is opened in the recipient's web browser at a resolution and size that fits the display capabilities of the user's PC and browser. Note that even at this point the user 10 is not required to download the image at the resolution and size that it was sent. Downloading the full-image sent is a feature available from the web page. In addition, the recipient is not required to be registered with the photo photomail server 20 just to view images 21, further simplifying the process.

In a further aspect of the present invention, viewing statistics may be provided as feedback to the senders of images 21. Examples of some types of viewing statistics include how many unique sessions have visited an album, and how many and which images 21 have been downloaded, for instance. The viewing statistics may be sent to the sender on a daily, weekly, or other user 10 configurable basis so the user 10 knows the images 21 are being viewed and downloaded. The feedback may either be sent to the user's regular email account or displayed in the user's photomail client 14.

A method and system of sharing images over a network has been disclosed that solves some of the inherent problems with sharing images using standard email. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. A method for sharing digital images over a network, wherein a first user desires to send images from a first computer to a second user having a second computer, the method comprising the steps of:
   a. Providing a client application for use on the first computer that communicates directly with a server, the client having a user interface that provides functions for managing the images;
   b. In response to a request by the first user to create an email for sending the images, displaying on the first computer by the client user interface an email request that appears as an email template, and allowing the first user to specify an address of the second user;
   c. Sending from the client application the email request with the images and the address of the second user directly to the server without sending the email request to an intervening mail server; and
   d. In response to the server receiving the email request,
      i. Storing the images on the server, and creating a web album for the images comprising one or more web pages containing scaled representations of the images, ii. Creating an email message from the email request,
iii. Inserting a link to the web album into the email message,
iv. Transmitting the email message over the network for delivery to the second user via the second computer, and
e. In response to the second user clicking on the link, displaying to the second user the web album containing the scaled images, whereby the second user is not required to download the images to view the images.

2. The method of claim 1 wherein step (d)(iv) further includes the step of: sending the email message to the second user through a mail server, and wherein the second user receives and opens the email message using a standard email program and clicks on the one link to display the web album.

3. The method of claim 2 wherein step (d)(i) further includes the step of: temporarily storing the selected images.

4. The method of claim 3 wherein step (d)(i) further includes the step of: providing the server with a web photo album application for creating the web album.

5. The method of claim 3 wherein step (d) includes the step of: creating an HTML email message from the email request and embedding links to the images in the HTML message, such that the images may be viewed in the standard email program.

6. The method of claim 3 wherein step (d) includes the step of: authenticating the first user when the email request is received.

7. The method of claim 3 wherein step (d) includes the step of: providing the server with a mail transformer application for creating the email message from the email request.

8. The method of claim 3 wherein step (d) includes the step of: providing the server with an image cache for temporarily storing the images.

9. A system for sharing digital images over a network, comprising:
a. A photomail client application executing on a user computer, the user computer being connected to a network and storing a plurality of digital images, wherein the photomail client includes a user interface that allows the user to select and edit images, and to form and send an email request that designates a recipient and includes the selected images, wherein the email request is displayed to appear as an email template; and
b. A server connected to the network for receiving the email request and in response to receiving the email request, perform functions of:
i. Storing the images included in the email request, and creating a web album for the images comprising one or more web pages containing scaled representations of the images,
ii. Creating an email message from the email request,
iii. Inserting a link to the web album into the email message,
iv. Transmitting the email message over the network for delivery to the recipient, and
v. In response to the recipient clicking on the link, displaying to the recipient the web album containing the scaled images, whereby the recipient is not required to download the images to view the images.

10. The system of claim 9 wherein the email message is sent to the recipient through a mail server, wherein once the recipient receives and opens the email message, the recipient may click on the link to display the web album.

11. The system of claim 10 wherein the server temporarily stores the selected images.

12. The system of claim 11 wherein a computer used by the recipient includes a standard email program, which is used by the recipient to receive and open the email message sent from the server.

13. The system of claim 11 wherein the server includes a web photo album application for creating the web album.

14. The system of claim 11 wherein the server embeds respective links to each of the images in the email message.

15. The system of claim 11 wherein the server creates an HTML email message and embeds links to the images in the HTML message, such that the images may be viewed in a standard email program.

16. The system of claim 11 wherein the server authenticates the user sending the email request.

17. The system of claim 11 wherein the server a mail transformer application for transforming the email request into the email message.

18. The system of claim 11 wherein the server includes an image cache for temporarily storing the images.

19. The system of claim 11 wherein the server supports multiple concurrent sends from the photomail client.

20. The system of claim 11 wherein the server sends viewing statistics to the user.

21. A computer-readable medium containing program instructions for sharing digital images over a network, wherein a first user desires to send images from a first computer to a second user having a second computer, the program instructions for:
a. Providing a client application for use on the first computer that communicates directly with a server, the client having a user interface that provides functions for managing the images;
b. In response to a request by the first user to create an email for sending the images, displaying on the first computer by the client user interface an email request that appears as an email template, and allowing the first user to specify an address of the second user;
c. Sending from the client application the email request with the images and the address of the second user directly to the server without sending the email request to an intervening mail server; and
d. In response to the server receiving the email request,
i. Storing the images on the server, and creating a web album for the images comprising one or more web pages containing scaled representations of the images,
ii. Creating an email message from the email request,
iii. Inserting a link to the web album into the email message,
iv. Transmitting the email message over the network for delivery to the second user via the second computer, and
e. In response to the second user clicking on the link, displaying to the second user the web album containing the scaled images, whereby the second user is not required to download the images to view the images.

22. The computer-readable medium of claim 21 wherein instruction (d)(iv) further includes the instruction of: sending the email message to the second user through a mail server, wherein the second user receives and opens the email message using a standard email program and clicks on the one link to display the web album.

23. The computer-readable medium of claim 22 wherein instruction (d)(i) further includes the instruction of: temporarily storing the selected images.

24. The computer-readable medium of claim 23 wherein instruction (d)(i) further includes the instruction of: providing the server with a web photo album application for creating the web album.

25. The computer-readable medium of claim 23 wherein instruction (d)(iii) further includes the instruction of: embedding respective links to each of the images in the email message.

26. The computer-readable medium of claim 23 wherein instruction (d) includes the instruction of: creating an HTML email message from the email request and embedding links to the images in the HTML message, such that the images may be viewed in the standard email program.

27. The computer-readable medium of claim 23 wherein instruction (d) includes the instruction of: authenticating the first user when the email request is received.

28. The computer-readable medium of claim 23 wherein instruction (d) includes the instruction of: providing the server with a mail transformer application for creating the email message from the email request.

29. The computer-readable medium of claim 23 wherein instruction (d) includes the instruction of: providing the server with an image cache for temporarily storing the images.

\* \* \* \* \*